Jan. 3, 1933.  M. W. THOMPSON  1,893,154
VEHICLE WHEEL
Filed Sept. 2, 1930
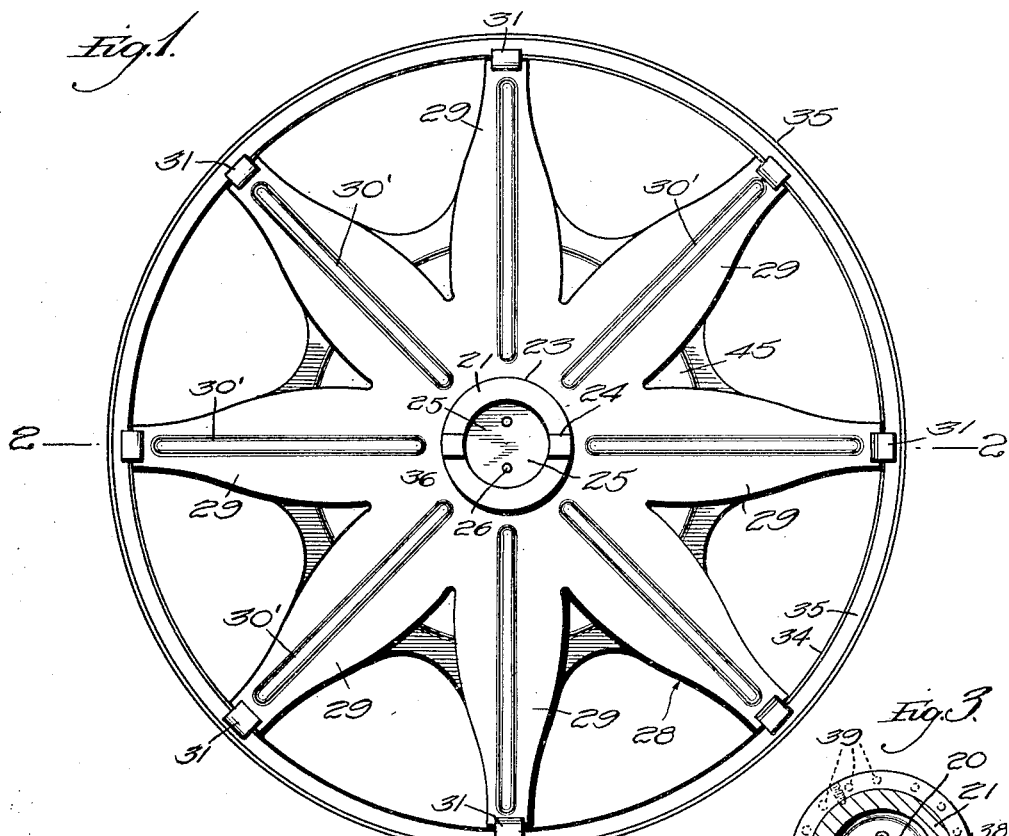
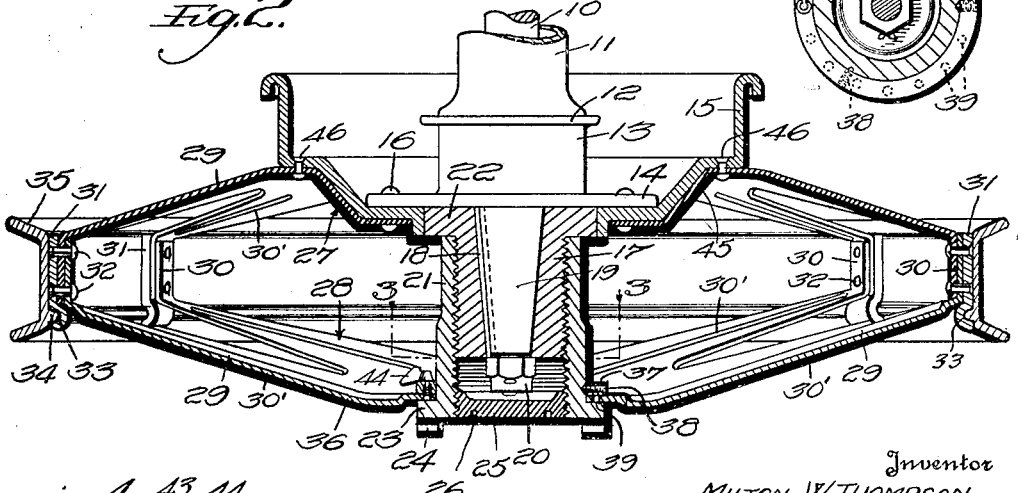
Inventor
MILTON W. THOMPSON
By C. L. Parker Jr.
Attorney Patented Jan. 3, 1933

1,893,154

UNITED STATES PATENT OFFICE

MILTON WESLEY THOMPSON, OF ATLANTA, GEORGIA

VEHICLE WHEEL

Application filed September 2, 1930. Serial No. 479,349.

This invention relates to vehicle wheels, and more particularly to a wheel device adapted for supporting a demountable rim.

It has been the common practice for several years to employ wire spokes in connection with motor vehicle wheels, but such constructions have been disadvantageous for the reason that it has been necessary to make the entire wheel demountable instead of providing a demountable rim construction, due to the difficulty of supporting a demountable rim at the outer end of the spokes. Accordingly it has been necessary to provide a vehicle equipped with this type of wheel with an entire spare wheel, and this type wheel is disadvantageous because of the additional expense of providing an entire spare wheel, and because of the difficulty of handling an entire wheel.

In my copending application Serial No. 387,426, filed August 21, 1929, now matured into Patent No. 1,812,573, granted June 30, 1931, I have disclosed a wheel construction which is adapted to overcome the disadvantages of the conventional wheel structures referred to above.

In my copending application I disclose a wheel device wherein an inboard and an outboard series of spokes is provided and these spokes are pivotally connected at their outer ends to rim engaging lugs. Means is provided for spreading the inner ends of the two series of spokes away from each other so as to decrease the circumference of the circle defined by the rim engaging lugs whereby these elements will become disengaged from the rim to permit the removal thereof. The means for spreading the two series of spokes also is operative for moving them toward each other to bring the rim engaging lugs into tight engagement with the rim to support it in operative position.

An important object of the present invention is to provide a wheel device of the general character referred to, which is an improvement over the structure shown in my copending application in that the structure is more efficient, and is simpler and cheaper to manufacture.

A further object is to provide a wheel device adapted for use in connection with a demountable rim of any desired conventional type, and wherein means is provided for readily permitting the rim to be engaged, or disengaged from the wheel device.

A further object is to provide a metallic spoke wheel device having a plurality of circumferentially spaced elements carried by the outer ends of the spokes and movable radially to permit the demountable rim to be clamped in position on the wheel device or to permit its removal therefrom.

A futher object is to provide a device of the character referred to which is readily operable for removing or replacing the rim with minimum effort, and without the use of special tools.

A further object is to provide a wheel device of the character referred to wherein inboard and outboard series of spokes are employed having their inner ends respectively connected to hub elements which are axially movable with respect to each other to effect radial movement of the rim engaging elements to permit them to be moved inwardly to release the rim or outwardly to engage the rim and hold it in operative position.

A further object is to provide a wheel device of the character referred to wherein the operation of mounting the wheel on the rim operates automatically to true up the rim to prevent it from running unevenly.

Other objects and advantages of the invention will become apparent during the course of the following description.

In the drawing I have shown one embodiment of the invention. In this showing,

Figure 1 is a side elevation showing the rim in position,

Figure 2 is a section on line 2—2 of Figure 1, parts being shown in elevation,

Figure 3 is a detail section on line 3—3 of Figure 2, and,

Figure 4 is a detail section of the latch device.

Referring to Figure 2, the numeral 10 designates one end of a rear axle of a motor vehicle surrounded by the usual housing 11. This housing is flanged at its outer end as at 12 to receive the axially inner end of a sleeve 13 which, in turn, is provided at its axially outer end with a radial flange 14. A brake drum 15 is riveted as at 16 or otherwise secured to the flange 14 to rotate therewith as will be apparent.

A hub 17 is keyed as at 18 or otherwise secured to the axially outer tapered end 19 of the axle, and a nut 20 is threaded on the extremity of the axle to secure the hub 17 in proper position thereon. The invention has been illustrated as being applied to the rear axle of the vehicle with the hub 17 keyed to the spindle 19, but it will be apparent that the invention is equally applicable to the front axles of vehicles, in which case suitable bearings will be provided between the axle spindle and the hub in accordance with standard practice.

As shown in Figure 2, a sleeve 21 is threaded on the hub 17 and has its axially inner end normally seating against a radial flange 22, preferably formed integral with the hub 17. The axially outer end of the sleeve 21 is provided with an outstanding radial flange 23, and is also provided with projecting lugs 24 by means of which the sleeve 21 may be rotated with respect to the hub 17 in a manner to be described. A cover plate 25 is threaded into the outer end of the sleeve 24 and is provided with recesses 26 adapted for engagement by a wrench to permit the cover plate to be removed.

Inboard and outboard spoke plates indicated by the numerals 27 and 28 are arranged as shown in Figure 2. These plates are preferably formed of stamped steel, and each is cut and stamped to provide spokes 29 reinforced by outwardly stamped ribs 30'. These ribs stiffen the spoke elements as will be apparent, but they do not entirely destroy their flexibility.

Each spoke of the inboard series is arranged in registration with one of the spokes of the outboard series, and the radially outer ends of the spokes are bent to provide extremities 30 which extend toward each other and overlap, as clearly shown in Figure 2. These overlapping ends provide connections between the spokes of each series, and each connection supports a rim engaging lug 31. The overlapping ends of each pair of spokes are riveted to each other and to the corresponding rim engaging lug as at 32. The rim engaging lugs may be of any desired type in accordance with the type of rim to be supported thereby. In the present instance, each lug is shown as being provided with a recess 33 adapted to receive an internal peripheral flange 34 carried by the rim 35.

The spoke plate 28 is provided with a solid radially inner portion 36 which surrounds the sleeve 21 in engagement with the flange 23. A collar 37 surrounds the sleeve 21 in contact with the axially inner face of the solid center portion 36, and the collar 37 is retained in position by set screws 38 engaging the sleeve 21. Accordingly it will be apparent that the radially inner portion of the spoke plate 28 will be fixed against axial movement with respect to the sleeve 21 by the flange 23 and collar 37.

Means is provided for normally preventing turning movement of the spoke plate 28 with respect to the sleeve 21. The spoke plate referred to is provided adjacent its inner periphery with a circumferentially arranged series of openings 39, as shown in Figures 2 and 3. One of these openings together with latch means therefor is shown in detail in Figure 4. The collar 37 is provided with a recess 40 in which a head 41 is slidably arranged, and this head is urged axially outwardly by a spring 42 to normally hold the head in engagement with one of the openings 39. A shank 43 projects inwardly through the collar 37 and carries a handle 44 which is operative in a manner to be described as a cam to retract the head 41 to the disengaged position shown in Figure 4.

The spoke plate 27 also is provided with a solid central portion 45 secured to the brake drum 15 by rivets 46 or the like. If desired, the inboard spoke plate may be terminated radially inwardly of the rivets 46, or they may be extended radially inwardly and shaped to contact with the inner face of the brake drum, and secured thereto by the rivets 16 previously described.

The operation of the device is as follows:

The parts normally occupy the positions shown in Figures 1 and 2, it being understood of course, that the usual tire will be mounted upon the rim 35. The latch member 41 will be in normal engagement with one of the openings 39, thus preventing any turning movement between the sleeve 21 and the spoke plates. Obviously, the driving of the wheel will be accomplished through the flange 14 and brake drum 15.

When it is desired to remove the rim, the latch handle 44 will be turned through approximately a quarter circle. In this connection it will be noted that the handle 44 normally occupies the position shown in Figure 2, the handle projecting beyond the collar 37. The handle has its inner surface angularly arranged as clearly shown in Figure 4 to act as a cam surface when brought into engagement with collar 37. Accordingly, when the handle 44 is turned to the position shown in Figure 4, the latch member 41 will be withdrawn from the opening 39, thus releasing the collar 37 and consequently the sleeve 21, from the spoke plate 36, whereby these elements are adapted to rotate with respect to each other.

A wrench or bar is then brought into engagement with the lugs 24 and the sleeve 21 rotated to cause it to move axially outwardly along the hub 17. If desired, the wrench or bar may be held stationary to prevent turning movement of the sleeve 21, and the rim and spoke plates may be rotated to accomplish the same result. As a matter of fact, the latter mode of operation is very simple and easy to accomplish.

The relative rotating movement between the sleeve 21 and the spoke plates causes the radially inner portions of the spoke plates to be spread apart, and this action causes the connections 30 to be drawn radially inwardly together with the lugs 31. Thus the circumference of the circle defined by the lugs 31 will be decreased sufficiently to release the lugs from the rim 35, and the latter readily may be withdrawn from operative position. It has been found that no pivotal connection need be provided between the radially outer ends of the spokes, or between the radially inner portions of the spoke plates and the elements to which they are connected. The spoke plates possess ample rigidity to effectually support the rim 35 in operation, but upon rotation of the sleeve 21, the flexibility of the spokes will be sufficient to permit the lugs to be released from the rim in the manner stated.

The rim may be replaced in operative position by reversing the operation described. The rim is placed over the lugs 31, whereupon the rotation of the sleeve 21 with respect to the spoke plates is reversed, and thus the sleeve 21 will move axially inwardly along the sleeve 17 until the axially inner end of the sleeve 21 firmly contacts with the flange 22. At this point, the lugs will have been firmly brought into engagement with the rim to support it in position. The handle 44 is then swung back to the normal position shown in Figure 2 to permit the latch 41 to snap into the nearest opening 39. The device then will be ready for operation.

The arrangement of the radially inner portion of the spoke plate 28 between the flange 23 and collar 37 prevents axial movement of the spoke plate with respect to the sleeve 21. The collar 37 is called upon to exert a force against the spoke plate 28 however, only when the rim is being removed, and under normal operating conditions, the sleeve 21 and flange 23 take up the axial thrust transmitted thereto through the spokes of the spoke plate 28. The device presents an attractive appearance, particularly in view of the provision of the stiffening ribs 30'. These ribs serve therefore to enhance the attractive appearance of the device and to reinforce the hub elements and reduce them to the proper flexibility, thus permitting the use of lighter gage steel in the manufacture of the device.

As is well known, vehicle rims are usually roughly handled when changing tires, and rims frequently are distorted from their true circular shapes. This results in causing the wheel to run unevenly in operation, thus causing vibration to be transmitted to the vehicle and wearing the tire unevenly. This result also can be caused with the usual constructions when the lug nuts of the rim are unevenly tightened. With the present device, the clamping action is transmitted to the rim engaging member by the application of force at a single point, namely through the rotation of the sleeve 21, and each lug engaging member accordingly will be moved radially outwardly exactly the same distance for a given turning movement of the sleeve 21. The device accordingly operates as means for holding the rim in a true circular shape even after it has been distorted through rough treatment while changing a tire. Thus uneven wearing of the tire and the transmission of vibration to the vehicle will be prevented.

It will be noted that applicant employs a series of independent rim engaging elements each of which is secured to the outer ends of one pair of spokes. These elements have no mechanical connection with the rim, but are merely pressed outwardly thereagainst upon proper operation of the hub elements, the driving of the rim depending wholly upon the frictional and clamping engagement between the rim engaging elements and the rim. This construction as will be apparent, wholly eliminates the necessity for a wheel felly or similar device. The term "rim engaging element" as employed in the following claims, is therefore intended to define an element of the character referred to, that is, an element which is secured to each pair of spokes and movable radially independently of the rim to be wholly released therefrom or to be brought into engagement therewith.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. In a wheel structure comprising axially movable hub elements, inboard and outboard plates having their radially outer portions formed to provide an inboard and an outboard series of flexible spokes, the radially inner portions of said plates being rigidly connected respectively to said hub elements, each spoke of each series being arranged opposite a spoke of the other series to form corresponding pairs of spokes, a connection between and fixed to the radially outer ends of the spokes of each pair, and a rim engaging element mounted radially outwardly of and secured to each connection.

2. In a wheel structure comprising axially movable hub elements, inboard and outboard plates having their radially outer portions formed to provide an inboard and an outboard series of flexible spokes, the radially inner portions of said plates being rigidly connected respectively to said hub elements, each spoke of each series being arranged opposite a spoke of the other series to form corresponding pairs of spokes, the spokes of each pair converging throughout their length toward their radially outer ends and having such ends spaced from each other a substantial distance, a connection between and fixed to the radially outer ends of the spokes of each pair, and a rim engaging element mounted radially outwardly of and against each connection and secured thereto.

3. In a wheel structure comprising axially movable hub elements, inboard and outboard plates having their radially outer portions formed to provide an inboard and an outboard series of flexible spokes, said plates having unbroken radially inner portions rigidly connected respectively to said hub elements, each spoke of each series being arranged opposite a spoke of the other series to form corresponding pairs of spokes, the spokes of each pair converging throughout their length toward their radially outer ends and having such ends spaced from each other a substantial distance, a connection between and fixed to the radially outer ends of the spokes of each pair, and a rim engaging lug arranged outwardly of and secured to each connection.

4. In a wheel structure comprising axially movable hub elements, a spoke structure comprising an inboard and an outboard series of spokes connected at their radially inner ends respectively to said hub elements, each spoke of each series being arranged opposite a spoke of the other series to form corresponding pairs of spokes, and a connection between and rigidly secured to the radially outer ends of the spokes of each pair, a rim engaging element carried by each connection, said spoke structure being resilient whereby axial movement of the hub elements away from each other effects inward radial movement of said rim engaging elements, and a circumferentially unbroken rim surrounding said elements in firm frictional engagement therewith when said hub elements are moved toward each other.

5. In a wheel structure comprising axially movable hub elements, an inboard and an outboard series of spokes connected at their radially inner ends respectively to said hub elements, each spoke of each series being arranged opposite a spoke of the other series to form corresponding pairs of spokes, a fixed connection between the radially outer ends of the spokes of each pair, each connection comprising overlapping members carried respectively by the radially outer ends of the spokes of one pair, and a rim engaging element mounted radially outwardly of and secured against each connection.

6. In a wheel structure comprising axially movable hub elements, a spoke structure comprising an inboard and an outboard series of spokes connected at their radially inner ends respectively to said hub elements, each spoke of each series being arranged opposite a spoke of the other series to form corresponding pairs of spokes, a connection between and rigidly secured to the radially outer ends of the spokes of each pair, and a rim engaging element rigidly secured against the radially outer face of each connection, the spokes of both series being resilient whereby axial movement of the hub elements in one direction effects inward radial movement of said rim engaging elements.

In testimony whereof I affix my signature.

MILTON WESLEY THOMPSON.